Oct. 13, 1931.  B. J. LEHUTA  1,826,799
ANIMAL TRAP
Filed April 3, 1931
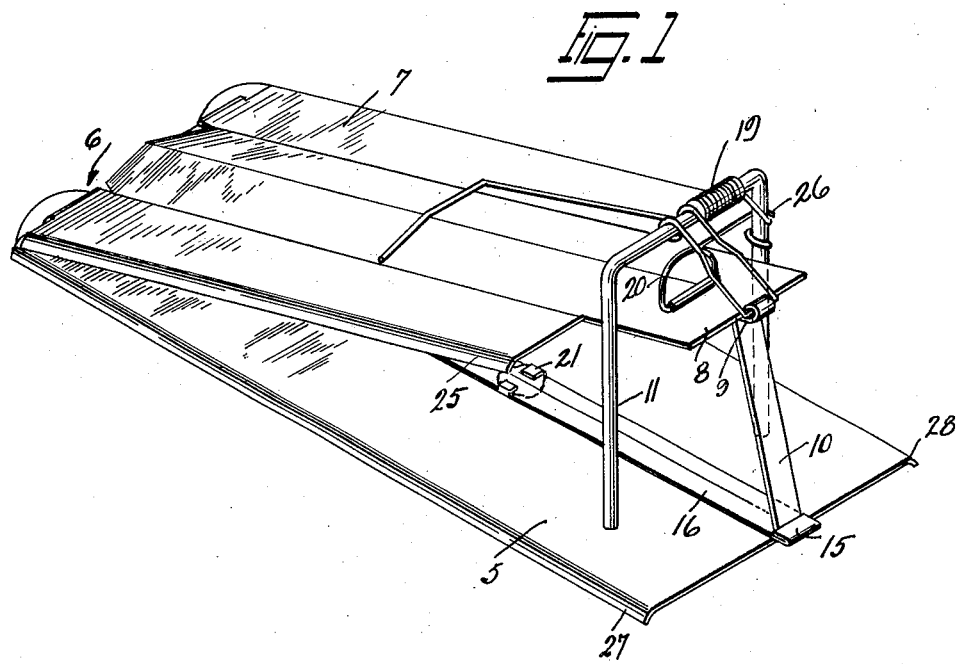

Patented Oct. 13, 1931

1,826,799

UNITED STATES PATENT OFFICE

BENEDIKT J. LEHUTA, OF BRIARCLIFF MANOR, NEW YORK

ANIMAL TRAP

Application filed April 3, 1931. Serial No. 527,444.

This invention relates to animal traps in general and more particularly to mouse or rat traps, and has for one of its objects the provision of a trap of the character described comprising a base, a spring pressed cover plate hingedly connected to the base and means on the said cover plate to insure instantaneous death to the mouse or rat when the trap is sprung.

Another object is to produce a device of the character described in which the maximum simplicity of construction and operation is secured.

Other objects and advantages will appear as the nature of the improvements is better understood, the invention consisting substantially in the novel arrangement and correlation of parts herein fully described, and illustrated in the accompanying drawings, wherein similar reference characters are used to describe corresponding parts throughout the several views, and then finally pointed out and specifically defined and indicated in the appended claim.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which Figure 1 is a perspective view of my improved trap shown open or baited.

Figure 2 is a longitudinal sectional view of the trap in closed or sprung position; and Figure 3 is a cross sectional view thereof taken on line 3—3 Fig. 2.

Referring now to the drawings in detail 5 indicates a base member, to the rear of which is hingedly connected as at 6 an upper or cover member 7. The said cover member 7 is provided near the front thereof with an extension 8 which is adapted, when the trap is set, to engage a shelf or ledge 9 on a spreader member 10 suspended from a wire loop supported on a frame work 11 secured to the base 5. The bottom end of the said member 10 also engages the front or turned over end 15 of a bait receiving trigger arm 16 pivoted on the hinge pin 17 of the hinge 6, by means of an ear 18 bent up from the said trigger arm 16.

A spring 19 on the frame 11 provides pressure for springing the trap when the trigger arm 16 is touched. A ring 20 at the forward end of the cover plate provides means for lifting the said cover plate against the tension of the spring 19 when it is desired to set the trap. Bait may be maintained on the arm 16, intermediate the ends thereof as at 21. The arm 16 may be V shaped in cross section through substantially the greater portion of its length for the sake of rigidity or strength and the cover plate is so formed in cross section as to accommodate the said trigger arm.

By referring to Figs. 1 and 3, it will be seen that the longitudinal edges 25 and 26 of the cover plate are bent downwardly and the corresponding edges 27 and 28 of the base 5 are likewise bent downwardly. This construction provides means for breaking the back of any mouse or rat and instantaneously killing same when the trap is sprung and the said rodent enters the trap from either side thereof.

It will also be understood that due to the position of the bait to the rear of the point of engagement of the bait carrying trigger arm and separator or spreader arm 10, any downward motion transmitted to the said trigger arm at the point 21 will be increased at 15, thus quickly springing the trap.

From the foregoing, it will be seen that I have provided a trap that is easily sprung, and one in which the animal entering the trap will be quickly killed and not suffer much after the trap is sprung.

It will also be seen that by increasing the size and weight of the trap, same may be used for trapping animals such as squirrels, hare, mink, etc.

Having described my invention, what I claim as new and desire to secure by Letters Patent is;

In a trap, a lower and upper plate hingedly connected at one end, the said plates being of substantially the same length and width, a bait carrying arm lying between the said plates pivotally supported on the lower plate at the hinge end, and extending beyond the opposite end of the plate, a frame at the said end, a spring on the frame in operative engagement with the top plate, means suspended from the said frame in engagement with the top plate and bait carrying arm for maintaining the trap in set position, and downwardly projecting side edges on the top plate for the purpose specified.

In testimony whereof I hereunto affix my signature.

BENEDIKT J. LEHUTA.